(12) United States Patent
Ashikaga

(10) Patent No.: US 7,871,690 B2
(45) Date of Patent: Jan. 18, 2011

(54) THERMOPLASTIC RESIN FILM COMPRISING A SCRATCH-RESISTANT SURFACE COATING FORMED FROM POLYURETHANE AND OLEFIN RESIN PARTICLES PROTRUDING FROM AN OUTER SURFACE OF THE COATING

(75) Inventor: Mitsuhiro Ashikaga, Ibaraski (JP)

(73) Assignee: Yupo Corporation, Tokyo (JP)

(*) Notice: Subject to any disclaimer, the term of this patent is extended or adjusted under 35 U.S.C. 154(b) by 387 days.

(21) Appl. No.: 11/349,144

(22) Filed: Feb. 8, 2006

(65) Prior Publication Data

US 2006/0128871 A1 Jun. 15, 2006

Related U.S. Application Data

(63) Continuation of application No. PCT/JP2004/011634, filed on Aug. 6, 2004.

(30) Foreign Application Priority Data

Aug. 8, 2003 (JP) .............................. 2003-290342

(51) Int. Cl.
| | |
|---|---|
| B32B 3/00 | (2006.01) |
| B32B 3/26 | (2006.01) |
| B32B 5/02 | (2006.01) |
| B32B 5/16 | (2006.01) |
| B32B 27/14 | (2006.01) |
| B32B 27/32 | (2006.01) |
| B32B 27/40 | (2006.01) |

(52) U.S. Cl. ................ 428/141; 428/143; 428/147; 428/304.4; 428/319.3; 428/323; 428/327; 428/343; 428/354; 428/423.1

(58) Field of Classification Search ....................... None
See application file for complete search history.

(56) References Cited

U.S. PATENT DOCUMENTS

| 6,221,485 B1 * | 4/2001 | Sanchez et al. ............. 428/352 |
| 6,228,433 B1 | 5/2001 | Witt |
| 6,592,950 B1 * | 7/2003 | Toshima et al. ............. 428/1.1 |
| 6,869,675 B2 * | 3/2005 | Nair et al. ................... 428/327 |

FOREIGN PATENT DOCUMENTS

| EP | 0 947 544 A2 | 10/1999 |
| EP | 1 104 702 A2 | 6/2001 |
| GB | 2 320 448 A | 6/1998 |
| JP | 2001-181588 | 7/2001 |
| WO | WO 03/029373 A2 | 4/2003 |

OTHER PUBLICATIONS

Database WPI Week 200158 Thomas Scientific, London, GB, XP-002517482, dated Mar. 10, 2009 (corresponds to JP 2001-181588).

* cited by examiner

*Primary Examiner*—Monique R Jackson
(74) *Attorney, Agent, or Firm*—Oblon, Spivak, McClelland, Maier & Neustadt, L.L.P.

(57) ABSTRACT

A thermoplastic resin film capable of ensuring ink adhesion in a printed matter having an oxidative polymerization-type ink or ultraviolet-curable ink, and imparting scratch resistance to the printed matter, contains on at least one surface thereof a coating layer containing (A) a curable resin having a pencil hardness according to JIS-K-5600-5-4 of HB or more and (B) an olefin-based resin, the coating layer having a protrusion originated in the olefin-based resin (B) on the outer surface of the thermoplastic resin film.

16 Claims, 1 Drawing Sheet

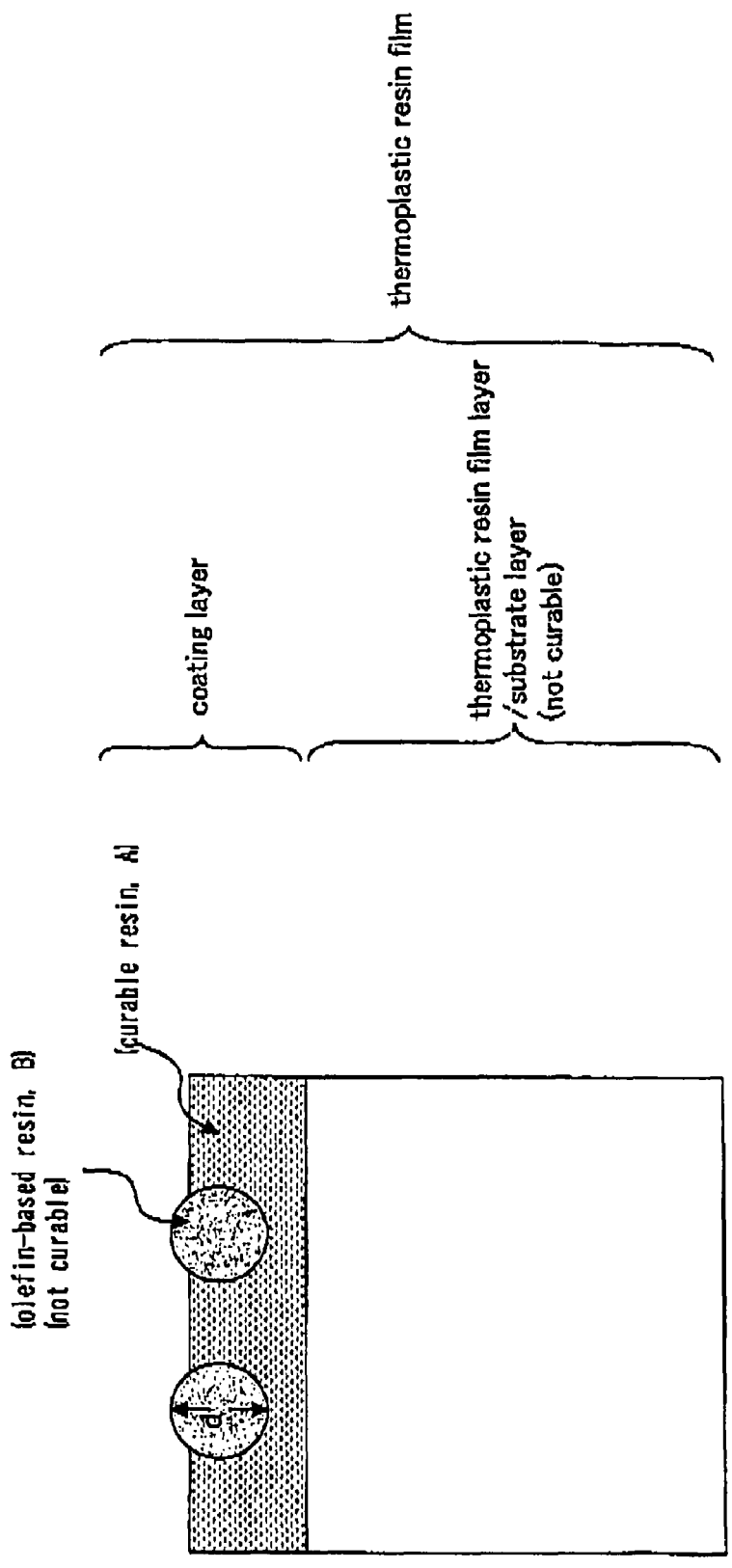
figure

THERMOPLASTIC RESIN FILM COMPRISING A SCRATCH-RESISTANT SURFACE COATING FORMED FROM POLYURETHANE AND OLEFIN RESIN PARTICLES PROTRUDING FROM AN OUTER SURFACE OF THE COATING

TECHNICAL FIELD

The present invention relates to a thermoplastic resin film ensuring excellent ink adhesion and high scratch resistance in a printed matter having an oxidative polymerization-type ink or an ultraviolet-curable ink.

BACKGROUND ART

In a printed matter required to have water resistance, like an outdoor poster or a label attached to a container for frozen food, a thermoplastic resin film such as polyethylene, polypropylene and polyethylene terephthalate film is used. Particularly, a white polyolefin-based synthetic paper with improved suitability for printing ensures that gravure printing, flexographic printing, letter press printing, offset printing or the like can be performed and an colorful printed matter can be obtained.

Such a polyolefin-based synthetic paper is usually subjected to an appropriate surface treatment to impart suitability for printing, such as ink transferability and ink adhesion, because the polyolefin-based resin used as a raw material has no polarity. As one of these surface treatments, a method of applying an oxidation treatment to the resin film surface and then coating a coating agent is known. As for the oxidation treatment, a method such as corona discharge treatment and flame treatment is known.

With respect to the coating agent, for example, a technique of coating a polyethyleneimine or an ethylene-imine.ethylene urea copolymer as the coating agent is disclosed in JP-A-01-141736 (the term "JP-A" as used herein means an "unexamined published Japanese patent application"), JP-A-06-025447 and JP-A-2000-29041.

However, the surface of such a surface-treated polyolefin-base synthetic paper is readily scratchable and when the printed matter is scratched in a processing step such as cutting and bookbinding, the ink is separated from the surface to cause a problem in practice. In the case where preventing this ink separation (scratch resistance) is necessary, it is required to use an abrasion-resistant ink at the printing or apply a surface varnish processing during or after printing and the cost becomes very high as compared with a normal printed matter.

An object of the present invention is to provide a thermoplastic resin film ensuring ink adhesion in a printed matter obtained by gravure printing, flexographic printing, letter press printing, offset printing or the like and moreover, imparting scratch resistance to the printed matter.

DISCLOSURE OF THE INVENTION

The above-described object of the present invention is attained by the following thermoplastic resin film, printed matter, and label having a pressure-sensitive adhesive layer.

1. A thermoplastic resin film comprising on at least one surface thereof a coating layer containing (A) a curable resin having a pencil hardness according to JIS-K-5600-5-4 of HB or more and (B) an olefin-based resin, wherein the coating layer has a protrusion originated in the olefin-based resin (B) on the outer surface of the thermoplastic resin film.

2. The thermoplastic resin film as described in 1 above, wherein the coating layer comprises from 5 to 99 wt % of the curable resin (A) and from 1 to 95 wt % of the olefin-based resin (B).

3. The thermoplastic resin film as described in 1 or 2 above, wherein the weight average particle diameter d (μm) of the olefin-based resin (B) and the number n of protrusions originated in the olefin-based resin (B) per area of 10,000 μm$^2$ on the thermoplastic resin film satisfy the following mathematical formula (1):

$$100 \leq 3n(d/2)^2 \leq 10,000 \quad (1)$$

4. The thermoplastic resin film as described in any one of 1 to 3 above, wherein the elongation percentage according to JIS-K-7113 of the curable resin (A) is 300% or less.

5. The thermoplastic resin film as described in any one of 1 to 4 above, wherein the curable resin (A) is at least one member selected from the group consisting of a thermosetting resin, an ultraviolet-curable resin and an electron beam-curable resin.

6. The thermoplastic resin film as described in 5 above, wherein the curable resin (A) is at least one member selected from the group consisting of a polyester acrylate-based resin, a polyether acrylate-based resin, a polyurethane acrylate-based resin, an epoxy acrylate-based resin, a (meth)acrylate-based resin, a urea-based resin, a phenol-based resin, an unsaturated polyester-based resin, an epoxy-based resin, a silicone-based resin, a melamine-based resin, an alkyd-based resin and a polyurethane-based resin.

7. The thermoplastic resin film as described in 6 above, wherein the curable resin (A) is a polyurethane-based resin.

8. The thermoplastic resin film as described in 7 above, wherein the polyurethane-based resin is at least one member selected from the group consisting of a polyether urethane-based resin and a polyether ester urethane-based resin.

9. The thermoplastic resin film as described in any one of 1 to 8 above, wherein the minimum film-forming temperature of the olefin-based resin (B) is 40° C. or more.

10. The thermoplastic resin film as described in any one of 1 to 9 above, wherein the weight average particle diameter d of the olefin-based resin (B) is from 0.1 to 10 μm.

11. The thermoplastic resin film as described in any one of 1 to 10 above, wherein the olefin-based resin (B) comprises an olefin copolymer having bonded thereto at least one group selected from the group consisting of a carboxylic acid and an anhydride thereof.

12. The thermoplastic resin film as described in 11 above, wherein the acid content of the olefin copolymer is 30 wt % or less.

13. The thermoplastic resin film as described in any one of 1 to 12 above, wherein the thermoplastic resin film comprises at least one member selected from the group consisting of an inorganic fine powder and an organic filler.

14. The thermoplastic resin film as described in 13 above, wherein the content of the at least one member selected from the group consisting of an inorganic fine powder and an organic filler is 75 wt % or less.

15. The thermoplastic resin film as described in any one of 1 to 14 above, wherein the thermoplastic resin film has a multilayer structure.

16. The thermoplastic resin film as described in any one of 1 to 15 above, wherein the thermoplastic resin film is stretched in at least one direction.

17. The thermoplastic resin film as described in any one of 1 to 16 above, wherein the thermoplastic resin film has a porosity of 1% or more.

18. A printed matter using the thermoplastic resin film described in any one of 1 to 17.

19. A label obtained by providing a pressure-sensitive adhesive layer on at least one surface of the thermoplastic resin film described in any one of 1 to 17.

BRIEF DESCRIPTION OF THE DRAWING

FIG. 1 is an outline cross-sectional view schematically showing one example of the coating layer in the thermoplastic resin film of the present invention.

The symbols in the FIGURE are as follows.

A: Curable resin

B: Olefin-based resin

BEST MODE FOR CARRYING OUT THE INVENTION

The present invention is described in detail below.

(I) Thermoplastic Resin Film Layer (Substrate Layer)

(1) The thermoplastic resin used as the raw material includes an ethylene-based resin such as high-density polyethylene and medium-density polyethylene; propylene-based resin; a polyolefin-based resin such as polymethyl-1-pentene resin and ethylene-cyclic olefin copolymer; a polyamide-based resin such as nylon-6, nylon-6,6, nylon-6,10 and nylon-6,12; a thermoplastic polyester-based resin such as polyethylene terephthalate, copolymer thereof, polyethylene naphthalate and aliphatic polyester; and a thermoplastic resin such as polycarbonate, atactic polystyrene, syndiotactic polystyrene, polymethyl methacrylate, polyvinyl chloride, polyvinylidene chloride, ethylene-vinyl acetate copolymer, and polyphenylene sulfide. Two or more of these thermoplastic resins may used as a mixture.

Among these thermoplastic resins, from the standpoint of more successfully bringing out the effect of the present invention, preferred are a polyethylene terephthalate or a copolymer thereof, a mixture obtained by mixing therewith a polypropylene, a polystyrene, a polymethyl-1-pentene resin, an ethylene-cyclic olefin copolymer or the like, and a nonpolar polyolefin-based resin. Furthermore, among the polyolefin-based resins, a propylene-based resin is preferred in view of chemical resistance and cost. As for such a propylene-based resin, a polypropylene which is an isotactic or syndiotactic propylene homopolymer and shows various stereoregularities, or a copolymer of a propylene as the main component with an α-olefin such as ethylene, butene-1, hexene-1, heptene-1 and 4-methylpentene-1, is used. The copolymer may have a binary system, a ternary system or a quaternary system and may be a random copolymer or a block copolymer.

In the case of using a propylene homopolymer, it is preferred for obtaining good stretching property to blend from 2 to 25 wt % of a resin having a melting point lower than that of the propylene homopolymer, such as polyethylene and ethylenevinyl acetate copolymer.

The thermoplastic resin film may have a two-layer structure or a multilayer structure consisting of three or more layers, and the stretching axis number of this multilayer structure may be uniaxial/uniaxial, uni-axial/biaxial, biaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial or biaxial/biaxial/biaxial. When the film formed as a multilayer film, the printability, thermal transferability, abrasion resistance, secondary processing suitability and the like can be more enhanced. Also, the thermoplastic resin film may or may not contain an inorganic fine powder or an organic filler.

(2) Inorganic Fine Powder, Organic Filler

The inorganic fine powder and/or organic filler contained in the thermoplastic resin film are not particularly limited in their type.

Examples of the inorganic fine powder include heavy calcium carbonate, precipitated calcium carbonate, calcined clay, talc, barium sulfate, diatomaceous earth, magnesium oxide, zinc oxide, titanium oxide and silicon oxide. Such an inorganic powder may be surface-treated with a fatty acid or the like. Among these inorganic fine powders, heavy calcium carbonate, calcined clay and talc are preferred because of their inexpensiveness and good shapability.

Examples of the organic filler include those having a melting point of 120 to 300° C. or a glass transition temperature of 120 to 280° C., such as polyethylene terephthalate, polybutylene terephthalate, polyamide, polycarbonate, polyethylene naphthalate, polystyrene, melamine resin, polyphenylene sulfite, polyimide, polyethyl ether ketone, polyether ether ketone, polyphenylene sulfite, poly-4-methyl-1-pentene, polymethyl methacrylate, a homopolymer of cyclic olefin, and a copolymer of cyclic olefin and ethylene.

One member selected from these inorganic fine powders and/or organic fillers may used alone, or two or more thereof may be used in combination. The content of the inorganic fine powder and/or organic filler is 75 wt % or less, preferably from 0.5 to 65 wt %, more preferably from 3 to 55 wt %.

In the thermoplastic resin film, if the amount of the inorganic fine powder and/or organic filler contained in the substrate layer of a single-layer structure or a multilayer structure exceeds 75 wt %, the stretched resin film is readily ruptured at the transverse stretching performed after longitudinal stretching. Also, if the amount of the inorganic fine powder and/or organic filler contained in the surface layer of a multilayer structure exceeds 75 wt %, the surface strength of the surface layer after transverse stretching is low and the surface layer causes material failure at the color spreading of printing ink.

The average particle diameter of the inorganic fine powder for use in the present invention and the average dispersion particle diameter of the organic filler are preferably from 0.01 to 20 µm, more preferably from 0.05 to 15 µm. Considering easiness of mixing with a thermoplastic resin, an inorganic fine powder and/or organic filler of 0.01 µm or more is preferably used.

If the particle diameter is less than 0.01 µm, pore formation by stretching becomes difficult and a stretched film having a desired surface tends to be not obtained, whereas if the particle diameter exceeds 20 µm, the stretchability decreases and this causes many occurrences of drawing breakage or causes holes during the shaping.

Furthermore, if desired, a stabilizer, a light stabilizer, a dispersant, a lubricant and the like may also be blended. A stabilizer such as steric hindered phenol type, phosphorus type and amine type may be blended in an amount of 0.001 to 1 wt % as the stabilizer, a light stabilizer such as steric hindered amine or benzotriazole type and benzophenone type may be blended in an amount of 0.001 to 1 wt % as the light stabilizer, and a dispersant for the inorganic fine powder, such as silane coupling agent, higher fatty acid (e.g., oleic acid, stearic acid), metal soap, polyacrylic acid, polymethacrylic acid or a salt thereof, may be blended in an amount of 0.01 to 4 wt %.

(3) Shaping of Thermoplastic Resin Film

The shaping method for the thermoplastic resin film is not particularly limited and various known methods may be used, but specific examples thereof include a cast molding method of extruding a molten resin into a film form by using a single-layer or multilayer T-die or I-die connected to a screw-type extruder, a calender molding method, a rolling molding method, an inflation molding method, a method of removing a solvent or an oil after the cast molding or calender molding of a mixture of a thermoplastic resin with an organic solvent or an oil, a method of shaping a film from a thermoplastic resin solution and removing a solvent, and a film shaping method of applying lamination to at least one surface of a thermoplastic resin film, a pulp sheet or a non-woven fabric by using melt lamination or an adhesive.

In the case of stretching the film, various known methods may be used, but specific examples thereof include longitudinal stretching utilizing a difference in the peripheral speed among a group of rolls, and transverse stretching using a tenter oven. Specifically, the stretching can be performed within a known temperature range suitable for each thermoplastic resin, that is, in the case of an amorphous resin, at a temperature not less than the glass transition temperature of the thermoplastic resin used and in the case of a crystalline resin, at a temperature from the glass transition temperature of the amorphous moiety to the melting point of the crystalline moiety. Examples of the stretching include longitudinal stretching utilizing a difference in the peripheral speed among a group of rolls, transverse stretching using a tenter oven, rolling, and simultaneous biaxial stretching by a combination of a tenter oven and a linear motor. Two or more of these methods may be used in combination. Among these, sequential biaxial stretching of performing transverse stretching after longitudinal stretching is preferred.

As for the specific production example of the substrate, a resin composition for the substrate layer is melt-kneaded and extruded into a sheet form, and the obtained sheet is longitudinally stretched by utilizing a difference in the peripheral speed among a group of rolls. Subsequently, a resin composition for the surface layer is melt-kneaded and laminated in a sheet form on at least one surface of the longitudinally stretched film, and the resulting laminate is transversely stretched by using a tenter, then heat-treated and cooled, whereby a resin film is obtained.

The draw ratio is not particularly limited and is appropriately selected according to the purpose and the properties of the thermoplastic resin used. For example, when a propylene homopolymer or a copolymer thereof is used as the thermoplastic resin, the draw ratio is from about 1.2 to 12 times, preferably from 2 to 10 times, for stretching in one direction, and from 1.5 to 60 times, preferably from 10 to 50 times, in terms of the area ratio, for biaxial stretching. When a thermoplastic resin other than propylene is used, the draw ratio is from 1.2 to 10 times, preferably from 2 to 5 times, for stretching in one direction, and from 1.5 to 20 times, preferably from 4 to 12 times, in terms of the area ratio, for biaxial stretching. Furthermore, heat treatment at a high temperature is applied, if desired.

The stretching temperature is a temperature 2 to 150° C. lower than the melting point of the thermoplastic resin used. The stretching temperature is preferably from 120 to 165° C. in the case where the thermoplastic resin is a propylene homopolymer (melting point: 155 to 167° C.), and it is preferably from 80 to 120° C. in the case of high-density polyethylene (melting point: 121 to 134° C.) and from 104 to 115° C. in the case of polyethylene terephthalate (melting point: 246 to 252° C.). The stretching rate is from 20 to 350 m/min.

The thickness of the thermoplastic resin film after stretching is from 20 to 350 μm, preferably from 35 to 300 μm.

The thermoplastic film of the present invention is preferably stretched at least in one direction. Also, the void ratio calculated according to the following formula is preferably from 1 to 60%, more preferably from 2 to 40%, still more preferably from 3 to 35%. If the void ratio is less than 1%, reduction in the weight can be hardly attained, whereas if it exceeds 60%, this tends to readily cause a problem in the film strength.

$$\text{Void ratio}(\%) = [(\rho o - \rho)/(\rho o)] \times 100 \quad \text{(formula 2)}$$

where ρo represents a true density of the stretched film, and ρ represents a density (according to JIS-P-8118) of the stretched film. Unless the material before stretching contains a large amount of air, the true density is nearly the same as the density before stretching.

The thermoplastic resin film preferably has an opacity (according to JIS-Z-8722) of 10 to 100%. The opacity is preferably from 10 to less than 70% for a translucent film and preferably from 70 to 100% for an opaque film. If the opacity is less than 10%, the void ratio of voids formed inside the film becomes less than 1% and reduction in the weight tends to be hardly obtained.

The thermoplastic resin film preferably has a density of 0.65 to 1.10 g/cm$^3$.

The density is preferably from 0.90 to 1.10 g/cm$^3$ for a translucent film and preferably from 0.65 to less than 0.90 g/cm$^3$ for an opaque film.

(II) Surface Oxidation Treatment

Examples of the surface oxidation treatment for the thermoplastic resin film include a treating method selected from corona treatment, flame treatment, plasma treatment, glow discharge treatment and ozone treatment. Among these, corona treatment and flame treatment are preferred. The treating amount is, in the case of corona treatment, from 10 to 200 W·min/m$^2$ (from 600 to 12,000 J/m$^2$), preferably from 20 to 180 W·min/m$^2$ (from 1,200 to 9,000 J/m$^2$), and in the case of flame treatment, from 8,000 to 200,000 J/m$^2$, preferably from 10,000 to 150,000 J/m$^2$.

(III) Coating Layer (1) Constitution of Coating Layer

The basic constitution of the coating layer in the thermoplastic film of the present invention is described by referring to the drawing. FIG. 1 is an outline cross-sectional view schematically showing one example of the coating layer in the thermoplastic film of the present invention. In FIG. 1, the coating layer comprises (A) a curable resin having a pencil hardness according to JIS-K-5600-5-4 of HB or more and (B) an olefin-based resin, and has a protrusion originated in the olefin-based resin (B) on the outer surface of the thermoplastic resin film.

The ratio by wt % between the curable resin and the olefin-based resin is from 5 to 99 wt % of the curable resin and from 1 to 95 wt % of the olefin-based resin, preferably from 10 to 95% of the curable resin and from 5 to 90 wt % of the olefin-based resin, more preferably from 30 to 95 wt % of the curable resin and from 5 to 70 wt % of the olefin-based resin.

If the ratio of the curable resin is less than 5 wt % or the ratio of the olefin-based resin exceeds 95 wt %, the adhesion of the thermoplastic resin film to the olefin-based resin disadvantageously decreases.

The weight average particle diameter d (μm) of the olefin-based resin (B) and the number n of protrusions originated in the olefin-based resin (B) per area of 10,000 μm² on the thermoplastic resin film satisfy the following mathematical formula (1):

$$100 \leq 3n(d/2)^2 \leq 10,000 \qquad (1)$$

For example, when the weight average particle diameter is 2 μm, the number of particles per area of 10,000 μm² is 100/3≤n≤10,000/3, namely, 33≤n≤3,333. If the number of particles is as small as not satisfying the above-described mathematical formula, the scratch resistance is worsened, whereas if the number of particles is too large, the adhesion of ink decreases and this is not preferred.

(2) (A) Curable Resin Having a Pencil Hardness According to JIS-K-5600-5-4 of HB or More The curable resin for use in the present invention has an elongation percentage according to JIS-K-7113 of 300% or less. The elongation percentage is preferably 200% or less. If the elongation percentage exceeds 300%, the film strength of the coating layer decreases and the scratch resistance is disadvantageously worsened.

The curable resin is a curable resin having a pencil hardness according to JIS-K-5600-5-4 of HB or more.

As for this curable resin, a thermosetting resin, an ultraviolet-curable resin and an electron beam-curable resin can be used.

Examples of the thermosetting resin include a urea-based resin, a phenol-based resin, an unsaturated polyester-based resin, an epoxy-based resin, a silicone-based resin, a melamine-based resin, an alkyd-based resin and a polyurethane-based resin.

Examples of the ultraviolet-curable resin and electron beam-curable resin include a polyester acrylate-based resin, a polyether acrylate-based resin, a polyurethane acrylate-based resin, an epoxy acrylate-based resin and a (meth)acrylate-based resin.

In the present invention, in view of good dispersion stability of the olefin-based resin, a thermosetting resin is preferred, and a polyurethane-based resin is more preferred.

As for the polyurethane-based resin, a polyether urethane-based resin, a polyetherester urethane-based resin or a polycarbonate urethane-based resin may be used, but a polyether urethane-based resin or a polyetherester urethane-based resin is preferably used.

(3) (B) Olefin-Based Resin

The olefin-based resin for use in the present invention should have a minimum film-forming temperature of 40° C. or more. The minimum film-forming temperature is preferably 60° C. or more and more preferably 80° C. or more. If the minimum film-forming temperature is less than 40° C., the olefin-based resin cannot keep the particle shape after the coating and the scratch resistance disadvantageously decreases.

The olefin-based resin for use in the present invention is not particularly limited in its shape as long as the predetermined effect of the present invention is provided, but a spherical or closely spherical particle shape is preferred.

The olefin-based resin preferably has a weight average particle diameter of 0.1 to 10 μm. The weight average particle diameter is more preferably from 0.3 to 3 μm. If the weight average particle diameter is less than 0.1 μm, the scratch resistance becomes insufficient, whereas if the weight average particle diameter exceeds 10 μm, the ink transferability decreases and this is not preferred.

The olefin-based resin preferably contains an olefin copolymer having bonded thereto a carboxylic acid and/or an anhydride thereof.

The olefin copolymer having bonded thereto a carboxylic acid or an anhydride thereof preferably has an acid content of 30 wt % or less. The acid content is more preferably 20 wt % or less. If the acid content exceeds 30 wt %, the surface becomes sticky and cutting failure disadvantageously occurs in the processing step.

When an antistatic agent is added as an additional component to the coating layer, troubles due to adhesion of dusts or electrification at printing can be decreased. The antistatic agent is preferably a polymer-type antistatic agent and, for example, a cationic, anionic, amphoteric or nonionic antistatic agent can be used. Examples of the cationic type include those having an ammonium salt structure or a phosphonium salt structure. Examples of the anionic type include an alkali metal salt of sulfonic acid, phosphoric acid or carboxylic acid, for example, those having an alkali metal salt (e.g., lithium salt, sodium salt, potassium salt) structure of acrylic acid, methacrylic acid or (anhydrous) maleic acid, in the molecule structure.

The amphoteric type contains both the above-described cationic type and anionic type structures within the same molecule, and examples thereof include a betaine type. Examples of the nonionic type include an ethylene oxide polymer having an alkylene oxide structure, and a polymer containing an ethylene oxide polymerization component in the molecule chain. Other examples include a polymer-type antistatic agent having boron in the molecule structure.

In the coating layer, various known additives such as light stabilizer (e.g., hindered amine-type light stabilizer), antioxidant and flame retardant, may be incorporated, if desired. Various additives may be added to the coating agent and coated.

(IV) Formation of Coating Layer

The coating agent is coated, for example, by using a roll coater, a blade coater, an air knife coater, a size press coater, a gravure coater, a reverse coater a die coater or a spray coater, or by dipping. The coated amount of the coating agent is, in terms of the solid content, from 0.05 to 20 g/m², preferably from 0.1 to 10 g/m². The coating is applied to at least one surface of the shaped film and may be performed in the film shaping line or in a separate line on the already shaped film. In the case of containing a stretching step, the coating may be performed before or after the stretching. If desired, an excess solvent is removed through a drying step.

(V) Printing

The surface-treated thermoplastic resin film obtained in this way is suitable for various printing processes and can provide a printed matter in the sheet or roll form through printing or letter-printing not only by oxidative polymerization-type (solvent-type) offset printing but also by ultraviolet curing-type offset printing, relief printing, gravure printing, flexographic printing, letter press printing or the like.

(VI) The thermoplastic resin film of the present invention can also be used as a label by providing a pressure-sensitive adhesive layer on at least one surface. The kind and thickness (coated amount) of the pressure-sensitive adhesive layer provided can be variously selected according to the kind of adherend, environment on use, strength of adhesion, or the like.

As for the aqueous or solvent-type pressure-sensitive adhesive used in general, a rubber-based pressure-sensitive adhesive, an acryl-based pressure-sensitive adhesive and a silicone-base pressure-sensitive adhesive are representative, and specific examples of the rubber-based pressure sensitive adhesive include a polyisobutylene rubber, a butyl rubber, a mixture thereof, and an adhesive comprising such a rubber-based pressure-sensitive adhesive having blended thereto a tackifier such as rosin abietate, terpene.phenol copolymer and terpene-indene copolymer. Specific examples of the acryl-based pressure-sensitive adhesive include an adhesive having a glass transition point of −20° C. or less, such as 2-ethylhexyl acrylate.n-butyl acrylate copolymer and 2-ethylhexyl acrylate.ethyl acrylate.methyl methacrylate terpolymer.

Such a synthetic polymer pressure-sensitive adhesive is usable in the form of being dissolved in an organic solvent or being dispersed in water, such as dispersion or emulsion.

For the purpose of enhancing the opacity, a pigment such as titanium white may also be incorporated into the pressure-sensitive adhesive.

The pressure-sensitive adhesive layer can be formed by coating the pressure-sensitive adhesive in a solution state on the lamination surface between the thermoplastic resin film and a release paper. The coating is performed, for example, by a roll coater, a blade coater, a bar coater, an air knife coater, a gravure coater, a reverse coater, a die coater, a lip coater, a spray coater or a comma coater. By performing smoothing or passing through a drying step, if desired, the pressure-sensitive adhesive layer is formed.

The formation of the pressure-sensitive adhesive layer is generally performed by a method where a pressure-sensitive adhesive is coated on a release paper and, if desired, dried to form a pressure-sensitive adhesive layer, and a thermoplastic resin film is stacked thereon. However, depending on the case, the pressure-sensitive adhesive layer may be formed by coating a pressure-sensitive adhesive directly on a thermoplastic resin film.

The coated amount of the pressure-sensitive adhesive is not particularly limited but is usually from 3 to 60 g/m$^2$, preferably from 10 to 40 g/m$^2$, in terms of the solid content.

EXAMPLES

The present invention is described in greater detail below by referring to Examples and the like, but the present invention is not limited to these Examples and the like.

[1] Substrate Resin Film

Production Example 1 (P-1)

(1) Composition (E) prepared by blending 15 wt % of heavy calcium carbonate having an average particle diameter of 1.5 μm to a propylene homopolymer having a melt index (MFR) of 0.8 g/10 min was kneaded in an extruder set at 250° C., extruded into a sheet form and cooled by a cooling apparatus to obtain an unstretched sheet. The obtained sheet was heated at a temperature of 140° C. and then 5-fold stretched in the longitudinal direction.

(2) Composition (C) prepared by mixing 50 wt % of an ethylene-propylene random copolymer having an MFR of 10 g/10 min, 5 wt % of maleic acid-modified polypropylene and 45 wt % of calcium carbonate having an average particle diameter of 1.5 μm was melt-kneaded in an extruder set at 240° C., and Composition (D) prepared by mixing 55 wt % of a propylene homopolymer having an MFR of 4 g/10 min and 45 wt % of calcium carbonate having an average particle diameter of 1.5 μm was melt-kneaded in another extruder set at 240° C. These melt-kneaded products were stacked in a die and the resulting laminate was co-extruded on both surfaces of the longitudinally 5-fold stretched sheet obtained in (1) above such that (C) came to the outer side, thereby obtaining a five-layer laminate (C)/(D)/(E)/(D)/(C). This five-layer laminate was heated at 155° C. and then 8.0-fold stretched in the transverse direction to obtain a five-layer laminate film (thickness: 4 μm/28 μm/66 μm/28 μm/4 μm). The thus-obtained substrate had a void ratio of 33%, a density of 0.77 g/m$^3$, an opacity of 94% and a Beck smoothness of 200 seconds.

Production Example 2 (P-2)

A five-layer laminate was obtained in the same manner as in Production Example 1 except that the ethylene-propylene random copolymer having an MFR of 10 g/10 min in the composition of (C) in Production Example 1 was changed to a propylene homopolymer having an MFR of 10 g/10 min. The thus-obtained substrate had a void ratio of 34%, a density of 0.77 g/m$^3$, an opacity of 95% and a Beck smoothness of 300 seconds.

Production Example 3 (P-3)

A five-layer laminate was obtained in the same manner as in Production Example 1 except that the composition of (C) in Production Example 1 was changed to a propylene homopolymer having an MFR of 4 g/10 min. The thus-obtained substrate had a void ratio of 32%, a density of 0.78 g/m$^3$, an opacity of 93% and a Beck smoothness of 2,000 seconds.

Production Example 4 (P-4)

Composition (D) was prepared by blending 20 wt % of calcium carbonate having an average particle diameter of 1.5 μm to a mixture containing 72 wt % of a propylene homopolymer having a melt flow rate (MFR) of 0.8 g/10 min and 8 wt % of high-density polyethylene. Separately, a propylene homopolymer having an MFR of 4 g/10 min was blended to prepare Composition (C). These Compositions (C) and (D) each was melt-kneaded in a separate extruder set at 270° C., and the melt-kneaded products were stacked in the inside of a die to give (C)/(D)/(C) and then co-extruded from one die into a sheet form. This sheet was cooled by a cooling apparatus to obtain an unstretched sheet, and the unstretched sheet was heated at 155° C. and then 5-fold stretched in the longitudinal direction by utilizing a difference in the peripheral speed among a group of rolls.

Subsequently, this three-layer laminate was heated at 155° C., then 7.5-fold stretched in the transverse direction by using a tenter, and annealed at 163° C. to obtain a three-layer film. The surface of this three-layer laminate film was subjected to a corona discharge treatment to obtain a multilayer stretched resin film having a three-layer structure of (C)/(D)/(C) [thickness: 5 μm/50 μm/5 μm]. The thus-obtained substrate had a void ratio of 21%, a density of 0.80 g/m$^3$, an opacity of 90% and a Beck smoothness of 20,000 seconds.

Production Example 5 (P-5)

Composition (C) was prepared by blending 20 wt % of calcium carbonate having an average particle diameter of 1.5 μm to a mixture containing 72 wt % of a propylene homopolymer having a melt flow rate (MFR) of 0.8 g/10 min and 8 wt % of high-density polyethylene. Separately, Composition (D) was prepared by mixing 50 wt % of a propylene homopolymer having an MFR of 10 g/10 min, 5 wt % of maleic acid-modified polypropylene and 45 wt % of calcium carbonate having an average particle diameter of 1.5 μm.

These Compositions (C) and (D) each was melt-kneaded in a separate extruder set at 270° C., and the melt-kneaded products were co-extruded from one die into a sheet form to give (C)/(D)/(C) and cooled by a cooling apparatus to obtain an unstretched sheet. This sheet was heated at 130° C., then 5-fold stretched in the longitudinal direction by utilizing a difference in the peripheral speed among a group of rolls, and annealed at 145° C. to obtain a three-layer film. The surface of this three-layer laminate film was subjected to a corona discharge treatment to obtain a multilayer stretched resin having a three-layer structure of (C)/(D)/(C) [thickness: 15 μm/100 μm/15 μm]. The thus-obtained substrate had a void ratio of 30%, a density of 0.88 g/m³, an opacity of 91% and a Beck smoothness of 1,600 seconds.

Example 1

Both surfaces of Substrate (P-1) obtained above in Production Example 1 of Substrate Resin Film were surface-treated by using a corona discharge treating machine AGI-043D manufactured by Kasuga Electric Works Ltd. at a line speed of about 30 m/min and an applied energy density of 100 W·min/m². Thereafter, a coating solution prepared by blending 74 wt % of thermosetting polyester urethane-based resin "HUX-522" (trade name, produced by Asahi Denka Co., Ltd.) and 26 wt % of polyethylene resin emulsion "W700" (trade name, produced by Mitsui Chemicals, Inc.) was coated on both surfaces by using a roll coater and dried at a temperature of about 65° C. for tens of seconds. The resulting film was taken up to obtain a surface-modified synthetic paper with a coated amount of 0.15 g/m². The offset printability (ink transferability, adhesion and scratch resistance) of this synthetic paper was evaluated by the following methods.

[2] Evaluation

The transferability and adhesion of ink and the scratch resistance were evaluated by the following measuring methods.

(a) Evaluation of Ink Transferability

A pattern was offset printed on the obtained synthetic paper with an oxidative polymerization-type ink (Values G, produced by Dai-Nippon Ink & Chemicals, Inc., four colors of black, indigo, ruby and yellow) by using DAIYA 0F-4 (quarter-kiku size) produced by Mitsubishi Heavy Industries, Ltd., and the ink transfer density was measured. Furthermore, the transfer state of ink on the entire face was observed with an eye to examine whether transfer failure such as coating streak and white spot was present or not, and the ink transferability was evaluated on the following five-stage scale.

5: Very good (no problem in practice).

4: Good (no problem in practice).

3: The color of transferred ink is thin but this causes practically no trouble (almost no problem in practice).

2: The color of transferred ink is thin, and a coating streak is observed (somewhat a problem in practice).

1: Scarcely transferred (there is a problem in practice).

Example 1 was at the level of 5. The results are shown in Table 1.

(2) Evaluation of Ink Adhesion

A pattern was offset printed on the obtained synthetic paper with an oxidative polymerization-type ink (Values G, produced by Dai-Nippon Ink & Chemicals, Inc., four colors of black, indigo, ruby and yellow) by using DAIYA OF-4 (quarter-kiku size) produced by Mitsubishi Heavy Industries, Ltd., and after one day, Cellotape (a pressure-sensitive adhesive tape, produced by Nichiban Co., Ltd.) was attached and tightly stuck to a 100% halftone dot area and then quickly peeled off. The ink adhesion was evaluated on the following five-stage scale.

5: Ink is not separated at all (no problem in practice).

4: Ink in a small area is separated (no problem in practice).

3: The separated area is 25% or less (almost no problem in practice).

2: The separated area is approximately from 25 to 50% (somewhat a problem in practice).

1: The separated area is 50% or more (there is a problem in practice).

Example 1 was at the level of 5. The results are shown in Table 1.

(c) Evaluation of Scratch Resistance

A pattern was offset printed on the obtained synthetic paper with an oxidative polymerization-type ink (Values G, produced by Dai-Nippon Ink & Chemicals, Inc., four colors of black, indigo, ruby and yellow) by using DAIYA OF-4 (quarter-kiku size) produced by Mitsubishi Heavy Industries, Ltd., and after storing for 1 week in the piled state, a black ink 50% halftone area, a black ink 100% halftone area, and a 400% halftone area having overlapping of black, indigo, ruby and yellow inks were rubbed with a nail. The ink separation state was observed with an eye, and the scratch resistance was evaluated on the following five-stage scale.

5: Ink is not separated at all (no problem in practice).

4: Ink in a small area is separated (no problem in practice).

3: The separated area is 25% or less (almost no problem in practice).

2: The separated area is approximately from 25 to 50% (somewhat a problem in practice).

1: The separated area is 50% or more (there is a problem in practice).

Example 1 was at the level of 5. The results are shown in Table 1.

Example 2 to Example 4

Films were produced and evaluated by the same operation as in Example 1 except for changing the amount added and kind of the urethane resin in the coating agent. The results are shown in Table 1.

Example 5 to Example 8

Films were produced and evaluated by the same operation as in Example 1 except for changing the amount added and kind of the olefin-based resin in the coating agent. The results are shown in Table 1.

Example 9 to Example 12

Films were produced and evaluated by the same operation as in Example 1 except for changing the kind of the substrate resin sheet. The results are shown in Table 1.

Comparative Example 1

A film was produced and evaluated in the same manner as in Example 1 except for preparing the coating agent only from a urethane resin. The results are shown in Table 1.

Comparative Example 2

A film was produced and evaluated in the same manner as in Example 1 except for preparing the coating agent only from an olefin resin. The results are shown in Table 1.

Comparative Example 3

A film was produced and evaluated in the same manner as in Example 1 except for not applying the coating agent. The results are shown in Table 1.

Comparative Example 4

A film was produced and evaluated in the same manner as in Example 1 except for changing the kind of the urethane resin in the coating agent. The results are shown in Table 1.

TABLE 1

| | Substrate Resin Film | (A) Kind of Resin | (A) Elongation Percentage (%) | (A) Layer Thickness, t (μm) | (A) Blending Ratio (wt %) | (B) Kind of Resin | (B) Average Particle Diameter, d (μm) | (B) Number of Protrusions Originated in Olefin-Based Resin (protrusions/10,000 μm$^2$) | (B) Relational Expression of Average Particle Diameter d and Number of Protrusions n, $3n(d/2)^2$ | (B) Blending Ratio (wt %) |
|---|---|---|---|---|---|---|---|---|---|---|
| Example 1 | P-1 | A-1 | 160 | 0.15 | 74 | B-1 | 1 | 1000 | 750 | 26 |
| Example 2 | P-1 | A-1 | 160 | 0.01 | 16 | B-1 | 1 | 1000 | 750 | 84 |
| Example 3 | P-1 | A-1 | 160 | 0.9 | 94 | B-1 | 1 | 1000 | 750 | 6 |
| Example 4 | P-1 | A-2 | 70 | 0.15 | 74 | B-1 | 1 | 1000 | 750 | 26 |
| Example 5 | P-1 | A-1 | 160 | 0.15 | 95 | B-1 | 1 | 150 | 112 | 5 |
| Example 6 | P-1 | A-1 | 160 | 0.15 | 49 | B-1 | 1 | 3000 | 2250 | 51 |
| Example 7 | P-1 | A-1 | 160 | 0.15 | 97 | B-2 | 3 | 100 | 675 | 3 |
| Example 8 | P-1 | A-1 | 160 | 0.15 | 24 | B-1 | 1 | 12000 | 9000 | 76 |
| Example 9 | P-2 | A-1 | 160 | 0.15 | 74 | B-1 | 1 | 1000 | 750 | 26 |
| Example 10 | P-3 | A-1 | 160 | 0.15 | 74 | B-1 | 1 | 1000 | 750 | 26 |
| Example 11 | P-4 | A-1 | 160 | 0.15 | 74 | B-1 | 1 | 1000 | 750 | 26 |
| Example 12 | P-5 | A-1 | 160 | 0.15 | 74 | B-1 | 1 | 1000 | 750 | 26 |
| Comparative Example 1 | P-1 | A-1 | 160 | 0.15 | 100 | — | — | — | — | — |
| Comparative Example 2 | P-1 | — | — | — | — | B-1 | 1 | 1000 | 750 | 100 |
| Comparative Example 3 | P-1 | — | — | — | — | — | — | — | — | — |
| Comparative Example 4 | P-1 | A-3 | 500 | 0.15 | 74 | B-1 | 1 | 1000 | 750 | 26 |

| | Properties | | Scratch Resistance | | |
|---|---|---|---|---|---|
| | Ink Transferability | Ink Adhesion | Black 50% | Black 100% | Black, Indigo, Magenta and Yellow 400% |
| Example 1 | 5 | 5 | 5 | 5 | 5 |
| Example 2 | 5 | 5 | 5 | 5 | 5 |
| Example 3 | 5 | 5 | 5 | 5 | 5 |
| Example 4 | 5 | 5 | 5 | 5 | 5 |
| Example 5 | 5 | 5 | 4 | 5 | 5 |
| Example 6 | 5 | 5 | 5 | 5 | 5 |
| Example 7 | 5 | 5 | 5 | 5 | 5 |
| Example 8 | 5 | 4 | 5 | 5 | 5 |
| Example 9 | 5 | 5 | 5 | 5 | 5 |
| Example 10 | 5 | 5 | 5 | 5 | 5 |
| Example 11 | 5 | 5 | 5 | 5 | 5 |
| Example 12 | 5 | 5 | 5 | 5 | 5 |
| Comparative Example 1 | 5 | 5 | 1 | 5 | 5 |
| Comparative Example 2 | 3 | 2 | 5 | 5 | 5 |
| Comparative Example 3 | 5 | 1 | 1 | 1 | 1 |
| Comparative Example 4 | 5 | 5 | 1 | 5 | 5 |

A-1: Thermosetting polyester urethane-based resin "HUX-522" (trade name, produced by Asahi Denka Co., Ltd.), pencil hardness: 2H.
A-2: Thermosetting polyesterether urethane-based resin "HUX-523" (trade name, produced by Asahi Denka Co., Ltd.), pencil hardness: 4H.
A-3: Thermosetting polyester urethane-based resin "HUX-232" (trade name, produced by Asahi Denka Co., Ltd.), pencil hardness: B.
B-1: Polyethylene resin emulsion "W700" (trade name, produced by Mitsui Chemicals, Inc.)
B-2: Polyethylene resin emulsion "W100" (trade name, produced by Mitsui Chemicals, Inc.)

While the invention has been described in detail and with reference to specific examples thereof, it will be apparent to one skilled in the art that various changes are modifications can be made therein without departing from the spirit and scope thereof.

This application is based on the Japanese patent application (Application No. 2003-290342) filed on Aug. 8, 2003, the contents thereof being herein incorporated by reference.

INDUSTRIAL APPLICABILITY

The thermoplastic resin film of the present invention ensures ink adhesion in a printed matter having an oxidative polymerization-type ink or ultraviolet-curable ink, and moreover imparts scratch resistance to the printed matter.

The thermoplastic resin film of the present invention is used for a printed matter required to have water resistance, such as outdoor poster and label attached to a container for frozen food, and used for providing an colorful printed matter capable of being printed by gravure printing, flexographic printing, letter press printing, offset printing or the like.

The invention claimed is:

1. A coated film, comprising:
a thermoplastic resin film as a substrate; and
on at least one surface of said thermoplastic resin film, a coating layer comprising
(A) a thermosetting polyurethane-based curable resin having a pencil hardness after curing according to JIS-K-5600-5-4 of HB or more, and
(B) olefin resin particles which protrude from an outer surface of said coating layer; and
wherein a weight average particle diameter d (μm) of the olefin resin (B) particles and a number n of protrusions of said olefin resin (B) per area of 10,000 μm$^2$ on the coating layer satisfy the following mathematical formula (1):

$$100 \leq 3n(d/2)^2 \leq 10{,}000 \qquad (1).$$

2. The coated film as claimed in claim 1, wherein the weight average particle diameter d of the olefin resin (B) is from 0.1 to 10 μm.

3. A coated film, comprising:
a thermoplastic resin film as a substrate; and
on at least one surface of said thermoplastic resin film, a coating layer comprising
(A) a thermosetting polyurethane-based curable resin having a pencil hardness after curing according to JIS-K-5600-5-4 of HB or more, and
(B) olefin resin particles having a weight average particle diameter d of from 0.3 to 3 μm and which protrude from an outer surface of said coating layer; and
wherein a weight average particle diameter d (μm) of the olefin resin (B) particles and a number n of protrusions of said olefin resin (B) per area of 10,000 μm$^2$ on the coating layer satisfy the following mathematical formula (1):

$$100 \leq 3n(d/2)^2 \leq 10{,}000 \qquad (1).$$

4. The coated film as claimed in claim 3, wherein the coating layer comprises
from 5 to 99 wt % of the thermosetting polyurethane-based curable resin (A), and
from 1 to 95 wt % of the olefin resin (B),
each based on the weight of (A) and (B).

5. The coated film as claimed in claim 3, wherein an elongation percentage according to JIS-K-7113 of the thermosetting polyurethane-based curable resin (A) is 300% or less.

6. The coated film as claimed in claim 3, wherein the polyurethane resin comprises at least one member selected from the group consisting of a polyether urethane resin and a polyether ester urethane resin.

7. The coated film as claimed in claim 3, wherein a minimum film-forming temperature of the olefin resin (B) is 40° C. or more.

8. The coated film as claimed in claim 3, wherein the olefin resin (B) comprises an olefin copolymer comprising at least one group selected from the group consisting of a carboxylic acid and an anhydride thereof.

9. The coated film as claimed in claim 8, wherein an acid content of the olefin copolymer is 30 wt % or less, based on the weight of the olefin copolymer.

10. The coated film as claimed in claim 3, wherein the thermoplastic resin film comprises at least one member selected from the group consisting of an inorganic fine powder and an organic filler.

11. The coated film as claimed in claim 10, wherein the content of the at least one member selected from the group consisting of an inorganic fine powder and an organic filler is 75 wt % or less but not 0, based on the weight of the thermoplastic resin film.

12. The coated film as claimed in claim 3, wherein the thermoplastic resin film has a multilayer structure.

13. The coated film as claimed in claim 3, wherein the thermoplastic resin film is stretched in at least one direction.

14. The coated film as claimed in claim 3, wherein the thermoplastic resin film has a porosity of 1% or more.

15. A printed matter, comprising:
the coated film claimed in claim 3.

16. A label obtained by providing a pressure-sensitive adhesive layer on at least one surface of the substrate of said coated film claimed in claim 3.

* * * * *